United States Patent Office 3,544,560
Patented Dec. 1, 1970

3,544,560
PENICILLIN COMPOUNDS
Bernard J. Ludwig, North Brunswick, and Frank M. Berger and George M. Fukui, Princeton, N.J., assignors to Carter-Wallace, Inc., New York, N.Y., a corporation of Maryland
No Drawing. Filed July 19, 1968, Ser. No. 746,003
Int. Cl. C07d 99/16
U.S. Cl. 260—239.1    7 Claims

ABSTRACT OF THE DISCLOSURE

Novel α-phenoxy-β-hydroxy penicillins and salts thereof. The compounds possess valuable antibacterial activity and are particularly useful in cases where hypersensitivity to presently-available penicillins may occur.

---

The present invention relates to novel penicillin compounds. More particularly, the invention relates to novel penicillin compounds and their salts which are particularly useful in cases where hypersensitivity to presently-available penicillins may occur.

The value of penicillins have been somewhat limited due to the number of persons which are hypersensitive to the drug and which, upon administration thereof, develop reactions thereto ranging from mild erythema, or hives, to severe serum sickness and, in some cases, to acute anaphylaxis.

It has been estimated that approximately one out of twenty persons are hypersensitive to penicillins, to one degree or another. Consequently, a physician must use extreme caution in administering the drugs and must be prepared to administer resuscitative drugs, such as epinephrine or aminophylline, should a severe reaction develop in the patient.

It is an object of the invention to provide novel penicillin compounds and salts thereof which have valuable antibacterial action but which, at the same time, are free from undesirable side reactions. This and other objects of the present invention will become apparent to one skilled in the art in the light of the instant specification.

In its broad aspect, the invention relates to penicillin compounds which, in the acid form have the following general formula:

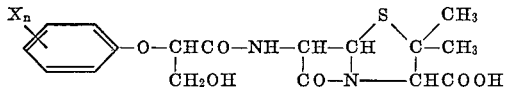

wherein $n$ is an integer having a value of 1–2 and each X is chlorine or lower alkyl. As used herein and in the appended claims, the term "lower alkyl" signifies alkyl radicals having from one to six carbon atoms.

The compounds of the present invention, which can be classified as phenoxyhydracrylamide derivatives of 6-aminopenicillanic acid (6-APA), can be prepared by the reaction of the proper acylating agent with 6-APA. These compounds have been obtained in the form of their hydrated potassium salts. Conversion of the free acids to their potassium salts can also be carried out under anhydrous conditions to obtain the salts in a nonhydrated form.

Illustrative compounds include, for example, dl - α - (4 - chlorophenoxy) - β - hydroxyethylpenicillin,
dl - α - (2 - chlorophenoxy) - α - hydroxyethylpenicillin,
dl - α - (2,4 - dichlorophenoxy) - α - hydroxyethylpenicillin, dl - α - (2 - methylphenoxy) - α - hydroxyethylpenicillin, dl - α - (4 - methylphenoxy) - α - hydroxyethylpenicillin, dl - α - (2 methyl - 4 - chlorophenoxy) - α - hydroxyethylpenicillin, dl - α - (2,4 - dimethylchlorophenoxy) - α - hydroxyethylpencillin, dl - α - (2-chloro - 4 - methylphenoxy) - α - hydroxyethylpenicillin, and the like.

The examples which follow illustrate the preparation of a representative number of said compounds and salts thereof as well as the preparation of the α-phenoxy-hydracrylic acids used as intermediates therein.

EXAMPLE 1

Preparation of potassium salt of dl-α-(4-chlorophenoxy)-β-hydroxyethylpenicillin A solution of 10 g. of α-(p-chlorophenoxy)-hydracrylic acid and 10 ml. of thionyl chloride in dioxane is stirred and heated under reflux for 6 hours. The solvent is removed under reduced pressure, dry benezene is added, and the mixture is concentrated again to dryness. The oil is dissolved in anhydrous acetone and added at 2° C. with stirring to a solution of 20 g. of potassium bicarbonate and 10 g. of 6-aminopenicillanic acid in water. The mixture is stirred for an additional hour without external cooling and then washed with ether. The aqueous layer is chilled and acidified to pH 1.8 with hydrochloric acid and extracted into chloroform. The chloroform solution is washed with a saturated solution of sodium chloride and dried over Drierite. 25 ml. of a 50% solution of potassium 2-ethylhexanoate in chloroform is added and the gelatinous precipitate is separated by centrifugation, washed with chloroform and then with an anhydrous ether. The product weighs 6.0 g. and melts with decomposition at 190–210° C. It is digested with hot ethanol to give 4.0 g. of product, m.p. 239–242° C. (dec.). Further purification is achieved by dissolving the solid in a 1:1 mixture of methanol and ethanol, evaporating the solvent until crystals appear, and chilling. The analytically pure material weighs 1.2 g. and melts with decomposition at 240–242° C. and has the analytical values summarized in Table I.

In a similar manner the potassium salt of dl-α-(2-methylphenoxy) - β - hydroxyethylpenicillin and dl-α-(2 - methyl - 4 - chlorophenoxy) - β - hydroxyethylpenicillin are prepared starting with α-(o-toloxy)-hydracrylic acid and dl-α-(4-chloro-o-toloxy)-hydracrylic acid respectively. The melting temperatures and anlytical values for these compounds are summarized in Table I.

EXAMPLE A

Preparation of dl-α-(p-chlorophenoxy)-hydracrylic acid 214.6 g. of ethyl 4-chlorophenoxyacetate is formylated with 81.5 g. of ethyl formate in the presence of 57 g. of sodium dispersed in paraffin to give a 75% yield of semisolid product. 233 g. of material obtained in this manner is dissolved in a solution of potassium hydroxide in aqueous ethanol and is reduced with 37.8 g. of sodium borohydride. The semisolid which separates is removed by filtration, and the filtrate is acidified with hydrochloric acid. The oil is extracted into ether, and the ether solution washed with water and dried over Drierite. After removing the solvent, an oil weighing 190 g. is obtained. The oil is triturated with nitromethane to give 145 g. of solid. The crude product is crystallized from nitromethane to obtain an analytically pure acid weighing 112 g. and melting at 135–136° C.

Analysis.—Calcd. for $C_9H_9ClO_4$ (percent): C. 49.90; H, 4.19; Cl, 16.37. Found (percent): C, 49.91; H, 4.14; Cl, 16.44.

In a similar manner dl - a - (o - toloxy) - hydracrylic acid, M.P. 88–89°, and dl - α - (4 - chloro - o-toloxy) hydracrylic acid, M.P. 110–112° were prepared.

TABLE I

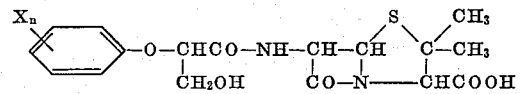

| No. | X | M.P., °C. | Formula | Carbon, percent | | Hydrogen, percent | | Nitrogen, percent | | Sulfur, percent | | Potassium, percent | |
|---|---|---|---|---|---|---|---|---|---|---|---|---|---|
| | | | | Calcd. | Fd. | Calcd. | Fd. | Calcd. | Fd. | Calcd. | Fd. | Calcd. | Fd. |
| 1 | 4-Cl | 240-242 | $C_{17}H_{18}ClN_2O_6SK$ [1] | 45.10 | 45.18 | 3.98 | 4.07 | 6.19 | 6.09 | 7.10 | 7.10 | 8.64 | 8.67 |
| 2 | 2-$CH_3$ | 223-235 | $C_{18}H_{21}N_2O_6SK$ | 49.98 | 49.89 | 4.89 | 4.82 | 6.47 | 6.36 | 7.41 | 7.40 | 9.04 | 8.83 |
| 3 | 2-$CH_3$-4-Cl | 226-228 | $C_{18}H_{20}ClN_2O_6SK$ [2] | 46.30 | 46.09 | 4.32 | 4.34 | 6.00 | 5.94 | 6.87 | 6.53 | 8.37 | 8.56 |

[1] Calcd.: Cl, 7.85; Fd.: Cl, 7.67.
[2] Calcd.: Cl, 7.59; Fd.: Cl, 7.75.

The activities of the synthetic pencillins of the invention were determined by injecting 0.1 ml. of an appropriately diluted Penicillin G antisera prepared by the method of Levine et al. (J. Exp. Med., 114:888, 1961) intradermally on three separate areas on one side of a guinea pig.

The other side of the guinea pig was injected in a similar manner with 0.1 ml. of rabbit BSA (bovine serum albumen) antisera in appropriate dilutions (1/500 to 1/2000) and 0.1 ml. of physiological saline solution.

Four hours later a 10-ml. mixture containing 1.0 mg. BSA, 10 mg. Penicillin G (KPG) or a synthetic penicillin compound conjugated to 1 mg. of HGG (human gamma globulin) in 0.5% Evans Blue dye solution was injected intravenously to each test animal. The KPG or synthetic penicillin and HGG were incubated together at pH 11.0 for 2 hours at 23° C. prior to use to produce the KPG-HGG or synthetic penicillin-HGG conjugated as described by Levine (J. Medicinal Chem., 7:675, 1964).

The test animals received the same amounts of a mixture containing 1.0 mg. BSA, 10 mg. of the benzylpenicilloyl derivative of KPG conjugated to 1 mg. of HGG in the manner described above in 0.5% Evans Blue dye solution. The benzylpenicilloyl derivative of KPG (BPO) is alleged to be the major derivative responsible for KPG allergy.

Fifteen minutes later the reactions at the sites of intradermal injections were visually observed and scored [passive cutaneous anaphylaxis (PCA) score] as follows, based on the diffusion of the Evans Blue dye around the injection site:

0   No reaction
1+  Very light blue ring, about 2–5 mm. in diameter
2+  Light blue ring, about 5–10 mm. in diameter
3+  Light blue ring, about 10–15 mm. in diameter
4+  Dark blue ring, about 15–20 mm. in diameter.

In general, all animals showed no reaction at the site of the saline injection and substantial reaction at the site of the BSA antisera injection.

The percent reduction of penicillin hyper-sensitivity for each compound was calculated according to the following formula:

$$\% \text{ Reduction of Hypersensitivity} = \frac{\text{Cumulative PCA Score of Control Animal Minus Cumulative PCA Score given in test animal}}{\text{Cumulative PCA Score Given by control animal}} \times 100$$

Table II, which follows, illustrates the PCA scores at different antisera concentrations for an illustrative compound of the invention and for penicillin.

The compound numbers used in Table II and in Table III correspond to the numbers used in Table I.

TABLE II

[Comparative PCA reactions evoked by BPO-HGG, compound 1-HGG conjugates in guinea pigs sensitized with penicillin G antisera]

| Challenge antigen | Guinea pig No. | PCA reaction at antisera dilution of— | | | | |
|---|---|---|---|---|---|---|
| | | Anti-KPG | | | Anti-BSA | Saline |
| | | 1/50 | 1/150 | 1/450 | 1/500 | |
| BPO-HGG (10:1) plus 1 mg. BSA | 1 | 4+ | 3+ | 0 | 4+ | 0 |
| | 2 | 4+ | 3+ | 1+ | 4+ | 0 |
| | 3 | 4+ | 3+ | 2+ | 4+ | 0 |
| | 4 | 4+ | 4+ | 3+ | 4+ | 0 |
| | 5 | 4+ | 3+ | 2+ | 4+ | 0 |
| | 6 | 4+ | 3+ | 2+ | 4+ | 0 |
| PCA score | | 24 | 19 | 10 | 24 | 0 |
| Compd. 1-HGG (10:1) plus 1 mg. BSA | 19 | 2+ | 0 | 0 | 4+ | 0 |
| | 20 | 0 | 0 | 0 | 4+ | 0 |
| | 21 | 2+ | 0 | 0 | 4+ | 0 |
| | 22 | 0 | 0 | 0 | 4+ | 0 |
| | 23 | 3+ | 2+ | 0 | 4+ | 0 |
| | 24 | 0 | 0 | 0 | 4+ | 0 |
| PCA score | | 7 | 2 | 0 | 24 | 0 |

Percent reduction (KPG-Ab, 1/50) = $\frac{24-7}{24} \times 100 = 71\%$.

Percent reduction (KPG-Ab, 1/150) = $\frac{19-2}{19} \times 100 = 89\%$.

Percent reduction (KPG-Ab, 1/450) = $\frac{10-0}{10} \times 100 = 100\%$.

The controls were included to demonstrate that PCA reactions were not evoked by mere injection of physiological saline solution; furthermore, all guinea pigs used in the assays were capable of eliciting comparable PCA reactions when sensitized with similar quantities of BSA antisera.

Table III, which follows, sets forth the effectiveness of a representative number of the penicillins of the invention in terms of percent reduction of hypersensitivity. The percent suppression indicated is an average obtained from several tests at 1/25 sera dilution.

TABLE III

| Compound No. | Total No. of animals tested | Average percent reduction |
|---|---|---|
| 1 | 23 | 78.1 |
| 2 | 24 | 93.4 |
| 3 | 12 | 100.0 |

The penicillin compounds of this invention are preferably administered orally in the form of tablets, capsules, or the like. The compounds may also be administered by injection using a suspension of the compound in water or isotonic saline solution or a solution of the compound in a solvent consisting of aqueous propylene glycol or polyethylene glycol. In addition to the active ingredient, the tablet contains conventional fillers, excipients, lubricants, etc. The active compound is generally in an amount from 25 to 90% by weight of the total composition. Typical examples of such tablets or capsules are those containing the penicillin active ingredient in an amount of from 100 to 1000 mg., preferably 500 mg.

What is claimed is:
1. A compound selected from the group consisting of the acids of the formula:

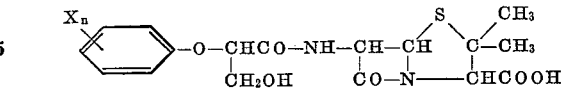

wherein $n$ is an integer having a value of 1–2 and each X is chlorine or lower alkyl, and the nontoxic pharmaceutically-acceptable salts thereof.

2. dl-α-(4-chlorophenoxy)-β-hydroxyethylpenicillin.

3. A nontoxic pharmaceutically-acceptable salt of the compound of claim 2.

4. dl-α-(2-methylphenoxy)-β-hydroxyethylpenicillin.

5. A nontoxic pharmaceutically-acceptable salt of the compound of claim 4.

6. dl-α-(2-methyl-4-chlorophenoxy)-α-hydroxyethylpenicillin.

7. A nontoxic pharmaceutically-acceptable salt of the compound of claim 6.

References Cited

UNITED STATES PATENTS

| 3,116,285 | 12/1963 | Celmer et al. | 260—239.1 |
| 3,316,248 | 4/1967 | Cheney | 260—239.1 |
| 3,352,852 | 11/1967 | Cheney | 260—239.1 |

NICHOLAS S. RIZZO, Primary Examiner

U.S. Cl. X.R.

424—271